H. P. STEWART.
PIPE CLEANER.
APPLICATION FILED OCT. 28, 1909.
957,389.
Patented May 10, 1910.
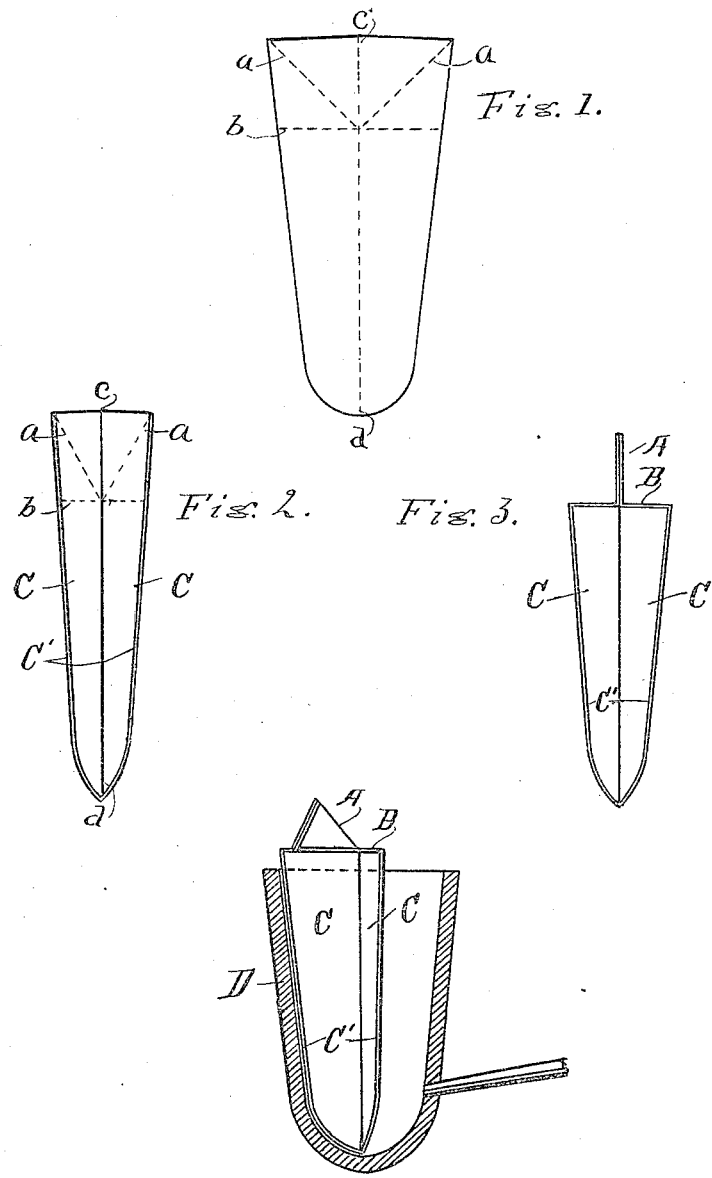
Witnesses
James Cilley
R. D. Mayo Sr.
Inventor
Horace P. Stewart
By Ithiel J. Cilley
Attorney

UNITED STATES PATENT OFFICE.

HORACE P. STEWART, OF ARMSTRONG CREEK, WISCONSIN.

PIPE-CLEANER.

957,389.

Specification of Letters Patent. Patented May 10, 1910.

Application filed October 28, 1909. Serial No. 525,210.

*To all whom it may concern:*

Be it known that I, HORACE P. STEWART, a citizen of the United States, residing at Armstrong Creek, in the county of Forest and State of Wisconsin, have invented certain new and useful Improvements in Pipe-Cleaners, of which the following is a specification.

My invention relates to improvements in implements for cleaning the coal and smoke accumulations from the inside of smokers' pipes, and its object is to provide an implement for the purpose stated, that will be convenient to carry, to use and to thoroughly clean the inside of a smoker's pipe, and which will, at the same time, be inexpensive of construction, thorough in its work and self sharpening. I attain these objects by the construction and arrangement of parts illustrated in the accompanying drawing, in which—

Figure 1 is a plan of the blank from which the implement is made. Fig. 2 is a perspective of the blank bent on the line c d of Fig. 1 to form the body or right angled wings. Fig. 3 is the same bent on the lines a, a, and b to form the top and handle of the implement, and Fig. 4 is a perspective of the implement shown in a vertical section of a pipe bowl.

Similar letters refer to similar parts throughout the several views.

This implement is made of thin sheet metal, preferably of steel, and is formed by first making a blank, as shown in Fig. 1, and then bending said blank upon the lines c d to form the body or right angled wings C, and upon the lines a, b, c, to form the upper end B and the handle A. This so forms the implement that the edges, C', of the body C will be in position to scrape upon the inner surface of the pipe bowl D and remove any substance that may be deposited thereon, when the implement is made to revolve in either direction, that is, to the right or to the left, by exerting force upon the handle A. The ashes, coal and other substances of which the coating of the pipe is composed, is of such a nature that when the implement is turned to the right the effect upon the left hand wing of the implement will be to keep it well polished and the outer edge C' sharp, so that when the implement is once made and sharpened, and is kept in use, there will never be any necessity of resharpening it, and the peculiar shape given it by bending it upon the line d renders it available for the purpose for which it is made until the wings are well worn toward the center line d.

To clean a pipe with this implement, the implement is placed in the bowl D of the pipe and the point of the implement forced down to the bottom of the bowl, with the edges C' and the apex of the right angle formed by the converging wings C C resting firmly against the inner surface of the bowl, or the coating that covers said inner surface, and the implement is held by gripping the handle A with the thumb and finger and turning it to the right or to the left, or both, as the case may be, though I find it much more satisfactory to continue to turn it in one direction when once started. As hereinbefore suggested, it should be turned in one direction at one time and in the other direction at other times so that the edges may be kept sharp to cut the deposit from the bowl, perfectly without the necessity of grinding or otherwise sharpening them apart from their normal use.

The wings C C that form the body of the implement should be made upon a, practically, true taper from their point of conjunction with the end B to near the point, from which point they should be made to conform very closely to the rounded form of the bottom of the bowl, so that they will, after use a few times, conform to the form of bowl.

What I claim as new, and desire to secure by Letters Patent of the United States, is:

1. A pipe bowl cleaner constructed from a single piece of sheet metal cut and bent to form a tapering body having two wings set at right angles, a back bent up integral therewith, and a handle formed integral with, and projecting back from said back.

2. A pipe bowl cleaner made from a single piece of sheet metal cut and bent to form a body having a back and a handle integral therewith, said body tapering from the back to the point and having two wings standing at right angles with the edges formed thereby in such position as to form cutting edges for the surface of the pipe bowl.

3. A pipe bowl cleaner composed of a single piece of sheet metal cut, bent and formed to make a body having wings that stand at right angles, a back and a handle formed integral therewith, said wings being so formed that when the cleaner is made to revolve the edge of one wing will cut the deposit from the inner surface of the bowl and the deposit in the bowl will polish and sharpen the edge of the other wing, said wings made to taper from the back to near the point of the body and thence to curve to the point, substantially as shown and described.

Signed at Grand Rapids Michigan October 26, 1909.

HORACE P. STEWART.

In presence of—
 ITHIEL J. CILLEY,
 BURT. G. DECKER.